United States Patent
Haddad et al.

(10) Patent No.: US 6,722,573 B2
(45) Date of Patent: Apr. 20, 2004

(54) APPARATUS AND METHOD FOR PROCESSING CODED INFORMATION STORED IN AN INTEGRATED CIRCUIT CARD

(75) Inventors: Aneace Haddad, Les-Arcs-sur-Argens (FR); Bernard Chevalier, Marseilles (FR)

(73) Assignee: Welcome Real-Time, Aix-en-Provence (FR)

( * ) Notice: Subject to any disclaimer, the term of this patent is extended or adjusted under 35 U.S.C. 154(b) by 0 days.

(21) Appl. No.: 10/194,999

(22) Filed: Jul. 15, 2002

(65) Prior Publication Data

US 2003/0047599 A1 Mar. 13, 2003

Related U.S. Application Data

(63) Continuation of application No. 09/920,401, filed on Aug. 2, 2001, now Pat. No. 6,419,161, which is a continuation of application No. 08/786,547, filed on Jan. 21, 1997, now abandoned.

(30) Foreign Application Priority Data

Jan. 22, 1996 (FR) .............................................. 96 00678

(51) Int. Cl.[7] .............................................. G06K 19/06
(52) U.S. Cl. ...................... 235/492; 235/379; 235/380; 235/381; 705/14
(58) Field of Search ................................ 235/492, 381, 235/379, 380; 705/14

(56) References Cited

U.S. PATENT DOCUMENTS

| | | | |
|---|---|---|---|
| 3,935,933 A | 2/1976 | Tanaka et al. | |
| 4,011,433 A | 3/1977 | Tateisi et al. | |
| 4,068,213 A | 1/1978 | Nakamura et al. | |
| 4,124,109 A | 11/1978 | Bissell et al. | |
| 4,554,446 A | 11/1985 | Murphy et al. | |
| 4,669,596 A | 6/1987 | Capers et al. | |
| 4,723,212 A | 2/1988 | Mindrun et al. | |

(List continued on next page.)

FOREIGN PATENT DOCUMENTS

| | | |
|---|---|---|
| EP | 0 189 691 | 12/1985 |
| EP | 0 253 240 B1 | 3/1992 |

(List continued on next page.)

OTHER PUBLICATIONS

"Smart Cards: Big Brother's Little Helpers", The Privacy Committee of New South Wales, dated Aug. 1995, pp. ii–v, 1–66.

(List continued on next page.)

Primary Examiner—Michael G. Lee
Assistant Examiner—Seung H Lee
(74) Attorney, Agent, or Firm—Banner & Witcoff, Ltd.

(57) ABSTRACT

The present invention relates to a method and a device for processing coded information stored on an integrated circuit card. A system includes a card reader adapted to receive the integrated circuit card and to read and write data values from an encrypted memory structure of the integrated circuit card. A processor electrically coupled to the card reader includes instructions for executing an algorithm that, in response to insertion of the integrated circuit card into the card reader, extracts information from one or more files stored in the encrypted memory, updates the files based on a current date and information extracted from the files. A display terminal electrically coupled to the processor displays information resulting from the execution of the algorithm. Thus, with the invention, it is possible to alter an operation on the basis of previous operations performed using the integrated circuit card. A method according to the invention includes steps of inserting the integrated circuit card into one of a plurality of card readers and processing the coded information stored thereon in accordance with the algorithm, which can be different for different card readers.

32 Claims, 2 Drawing Sheets

U.S. PATENT DOCUMENTS

| | | |
|---|---|---|
| 4,723,312 A | 2/1988 | Yamashita et al. |
| 4,755,660 A * | 7/1988 | Nakano ............... 235/380 |
| 4,809,837 A | 3/1989 | Hayashi |
| 4,816,653 A | 3/1989 | Anderl et al. |
| 4,837,422 A | 6/1989 | Dethloff et al. |
| 4,882,675 A | 11/1989 | Nichtberger et al. |
| 4,885,685 A | 12/1989 | Wolfberg et al. |
| 4,910,672 A | 3/1990 | Off et al. |
| 4,949,256 A | 8/1990 | Humble |
| 5,008,519 A | 4/1991 | Cunningham et al. |
| 5,025,372 A | 6/1991 | Burton et al. |
| 5,025,373 A | 6/1991 | Keyser, Jr. et al. |
| 5,036,461 A | 7/1991 | Elliott et al. |
| 5,047,614 A | 9/1991 | Bianco |
| 5,056,019 A | 10/1991 | Schultz et al. |
| 5,091,713 A | 2/1992 | Horne et al. |
| 5,117,855 A | 6/1992 | Goldsmith |
| 5,132,915 A | 7/1992 | Goodman |
| 5,173,851 A | 12/1992 | Off et al. |
| 5,185,695 A | 2/1993 | Pruchnicki |
| 5,192,854 A | 3/1993 | Counts |
| 5,202,826 A | 4/1993 | McCarthy |
| 5,380,991 A | 1/1995 | Valencia et al. |
| 5,401,946 A | 3/1995 | Weinblatt |
| RE34,915 E | 4/1995 | Nichtberger et al. |
| 5,450,938 A | 9/1995 | Rademacher |
| 5,513,102 A | 4/1996 | Auriemma |
| 5,515,270 A | 5/1996 | Weinblatt |
| 5,530,232 A * | 6/1996 | Taylor ............... 235/380 |
| 5,537,314 A | 7/1996 | Kanter |
| 5,559,313 A | 9/1996 | Claus et al. |
| 5,559,887 A * | 9/1996 | Davis et al. ............ 705/68 |
| 5,649,118 A | 7/1997 | Carlisle et al. |
| 5,689,100 A | 11/1997 | Carrithers et al. |
| 5,727,153 A | 3/1998 | Powell |
| 5,734,838 A | 3/1998 | Robinson et al. |
| 5,806,045 A | 9/1998 | Biorge et al. |
| 5,832,457 A | 11/1998 | O'Brien et al. |
| 5,857,175 A | 1/1999 | Day et al. |
| 5,970,469 A | 10/1999 | Scroggie et al. |
| 6,014,634 A | 1/2000 | Scroggie et al. |
| 6,035,280 A | 3/2000 | Christensen |

FOREIGN PATENT DOCUMENTS

| | | |
|---|---|---|
| EP | 0 512 509 B1 | 7/1999 |
| EP | 0 511 463 B1 | 8/1999 |
| GB | 2274349 | 7/1994 |
| WO | WO 91/18373 | 11/1991 |
| WO | WO 92/14213 | 8/1992 |
| WO | WO 93/08546 | 4/1993 |
| WO | WO 93/09515 | 5/1993 |
| WO | WO 95/03570 | 2/1995 |
| WO | WO 95/21428 | 8/1995 |
| WO | WO 96/39671 | 12/1996 |
| WO | WO 97/30410 | 8/1997 |

OTHER PUBLICATIONS

Clarke, Roger: "Chip–Based Payment Schemes: Stored Value cards and Beyond", Sep. 1996, pp. iii–v, 1–182.

"Gemplus and Loyalty Cards", undated but believed to be 1995.

"We are guinea pigs for smart card tests", The Australian Newspaper, Apr. 4, 1995.

"Give customers some incentives to return", Australian Supermarket News, May 5, 1993.

Prospectus of Intellect Holdings Limited (CAN 009 366 009), Oct. 27, 1994, pp. 1–88.

Paper by Gary Zentilomo "Co–operatives at the Leading Edge" conference in 1995, slides 1–14, pp. 1–16.

"Wizard Integrated Contactless Smartcard Solution" undated by allegedly distributed at CardTeach SecurTech Conference in Washington DC in Apr. 1995.

Garry: "On Target At Last", Progressive Grocer, Aug. 1992, vol. 71, No. 8, pp. 103–110.

DeBow: "Credit/Debit Debutus in Midwest Smart Card Test (Dahl's Supermarket Vision Value Club)", Computers in Banking, vol. 6, No. 11, pp. 10–14.

Eisman: "Get Smart", Incentive, vol. 168, No. 9, pp. 83–90.

POS News: "Frequent–Shopper Plans Get a Chipper Look", Jan. 3, 1995.

POS News: "Supermarket Update: Bank One Ready to Unite Electronic Payments With 'Vision Value' Shopper Cards", Sep. 1, 1993.

Supermarket Business: "A Look at the Checkout of the Future", p. 24.

Evans: "Direct Marketing: Rise and Rise or Rise and Fall?", Marketing Intelligence & Planning, vol. 13, No. 6, pp. 16–23.

Shaw: "How the Smart Card is Changing Retailing", Long Range Planning, vol. 24, No. 1, pp. 111–114.

"Smart Times Ahead", Banking Technology, Feb. 1995, pp. 22–25.

* cited by examiner

APPARATUS AND METHOD FOR PROCESSING CODED INFORMATION STORED IN AN INTEGRATED CIRCUIT CARD

This application is a continuation of Ser. No. 09/920,401 filed Aug. 2, 2001 now U.S. Pat. No. 6,419,161, issued Jul. 16, 2002, which is a continuation of U.S. application Ser. No. 08/786,547 filed Jan. 21, 1997 now abandoned, which claims priority to French application Ser. No. 96 00678, filed in France on Jan. 22, 1996.

The present invention relates to a method of processing coded information stored on an integrated circuit card.

It also relates to a system for implementing such a method.

The present invention finds application in the field of the processing coded integrated circuit cards that can be processed in card readers at a plurality of different locations. Each card reader is electrically coupled to a processor containing an algorithm that extracts information from one or more data files on the integrated circuit file, processes the data, and updates the data files based on prior uses of the integrated circuit card.

Thus, with the invention, it is possible to alter an operation on the basis of previous operations performed using the integrated circuit card.

A method is already known which enables specific benefits to be granted depending on the behavioral attitude of customers, and which consists essentially in sending a discount coupon through the post, shortly after the operation initiating purchase or payment by the holder.

Such a method has drawbacks. In fact it generates considerable delays and is of limited reliability (loss of coupons, change of address).

One of the technical problems solved by the invention consists in eliminating these considerable delays, by granting a benefit to the customer at the actual time of payment by the latter or more generally of the operation initiating the benefit.

According to the invention, the merchant will thus be able to recognize a customer on the basis of the frequency with which he calls in and of the size of his spending. It will then be possible to grant him a specified definite benefit automatically and instantaneously.

For this purpose the invention proposes in particular a method of processing coded information during a purchase or payment operation by a customer, holder of a card with a chip, at a merchant, in which the contents of the memory of the chip card are read and a coupon is or is not printed on the basis of the information arising from the contents of said memory, characterized in that, with the memory of the chip card including a first identification file, termed the Member file, identifying the card-holding customer, a second accounting file, termed the Points file, and a third file, termed the Behavior file, relating to the behavior of the card holder towards the merchant or merchants, a specified algorithmic processing is performed dependent, on the one hand, on the date of the operation and, on the other hand, on the information contained in said files, including the Behavior file, then data is written to the Points file, new information is written to the Behavior file, and said coupon is or is not printed on the basis of the result of said algorithmic processing.

Advantageous embodiments resort moreover to one and/or other of the following provisions:

the algorithmic processing includes a step of incrementing or decrementing the points file by a pre-specified number of points;

the coupon is only printed if the number of points contained in the Points file is greater than a specified value;

the coupon is only printed and/or the Points file is only incremented or decremented if the Member file corresponds to specified criteria;

the Points file is incremented more or less depending on the amount of the purchase or payment operation;

the Points file is incremented more or less depending on frequency and/or on the nature of first, second or xth visit by the card holder over a period of time of specified duration;

information corresponding to the operation is entered into a memory of a payment terminal located on the premises of said merchant, said entered information is compared with information stored in storage means and relating to pre-specified series of operations, and the results of these comparisons are processed in order to print a coupon and/or write to the Points file.

It is thus possible to undertake promotional operations which are limited in time and pertain to a collection of merchants belonging to the same network.

access to the files is enciphered through a so-called triple DES (Data Encryption Standard) encryption procedure.

The invention also proposes a device for processing coded information, during a purchase or payment operation by a user, holder of a card with a chip, comprising means for reading coded data from the memory of the chip card, computation means and means of printing a coupon, characterized in that, with the memory of the chip card including a first identification file, termed the Member file, identifying the card-holding customer, a second accounting file, termed the Points file, and a third file, termed the Behavior file, relating to the behavior of the card holder towards the merchant or merchants, the computation means include means of specified algorithmic processing dependent, on the one hand, on the date of the operation and, on the other hand, on the information contained in said files, including the Behavior file, and in that the device includes means for writing new information to the Points file and to the Behavior file on the basis of said specified algorithmic processing, the means of printing a coupon being configured so as to print or not print said coupon on the basis of the information arising from the contents of said files and from said algorithmic processing.

Advantageously, the device moreover includes:

means of entering data corresponding to said operation into a memory for intermediate storage and display of data, means of storing coded information relating to one or more operations, means of comparing between the data entered into said intermediate memory and information stored in said information storage means, means of processing the results of these comparisons, and means configured so as automatically to print or not print the coupon on the basis of the information arising from the contents of the memory of the chip card, and controlled by said means of processing said results.

The invention will be better understood on reading the description which follows of a particular embodiment given by way of non-limiting example.

The description refers to the drawings which accompany it and in which.

Figure 1:
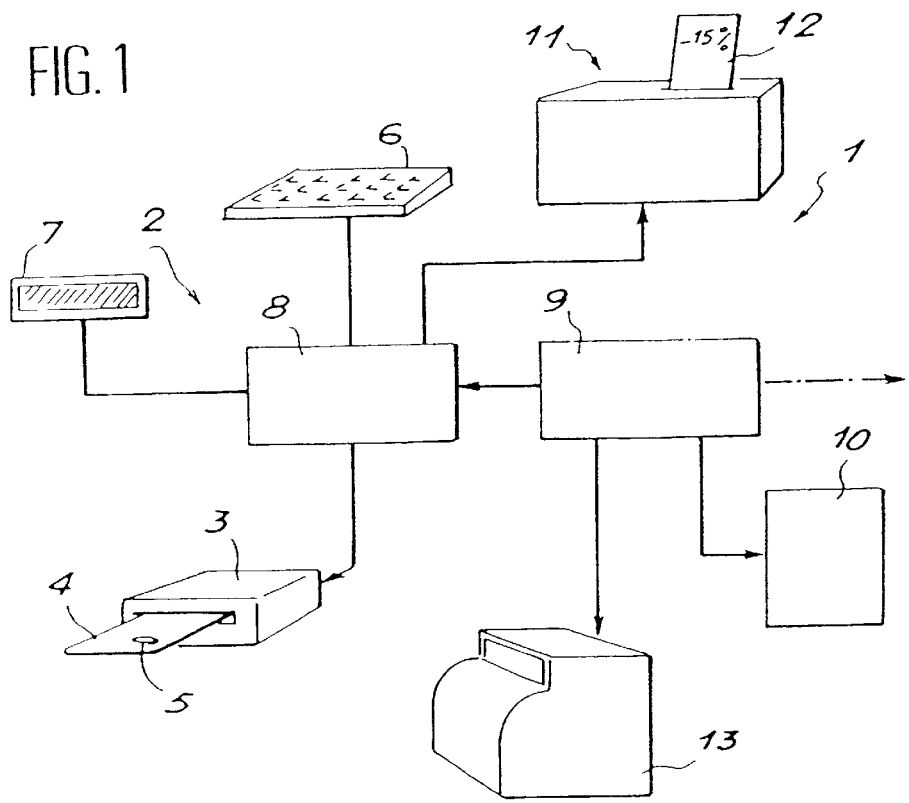
FIG. 1 shows a general diagram of a device according to an embodiment of the invention.

FIG. 1 shows a device 1 comprising a payment terminal 2 furnished with a reader 3 for a card 4 with a chip 5.

The payment terminal is for example of the type marketed under the reference Delta 15 by the French company Schlumberger.

The chip cards which can be used with the invention are for example cards sold under the references MP-COS by the French company Gemplus or ME 2000 by the French company Schlumberger.

They can be bank cards, personal credit cards or loyalty cards.

The terminal 2 comprises a keyboard 6, a display screen 7 and a processor 8 which can be programmed on the basis of specified algorithms in a manner known per se.

The processor 8 is connected to the reader 3 via a read/write circuit and to a microcomputer 9 itself connected to a mass memory 10.

The device 1 also comprises means 11 for printing a coupon 12 connected to the processor 8 and to a cash till 13 and invoice printer, for example via a computer 9.

The processor 8 is connected, possibly via the computer 9, to means (not represented) which are wholly remote from the site on which the device 1 is installed and which are configured so as to ensure the consistency of the processing and/or of the information processed and collected by various devices on various sites.

Figure 2:
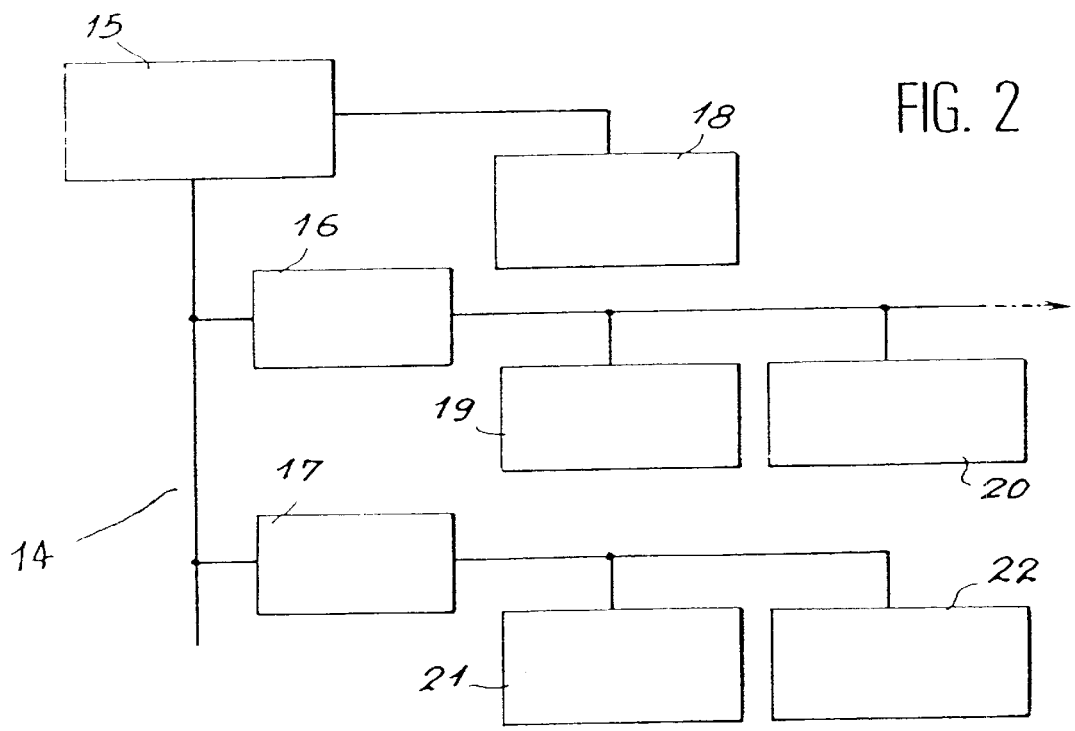
FIG. 2 is a partial block diagram of an embodiment of the memory of the chip card in the device according to the invention.

Depicted in FIG. 2 is the organization of an embodiment of the memory 14 of the chip 5 of the card 4.

The card comprises several applications, the memory 14 comprising a main directory or root 15.

It is organized into directories 16, 17, etc.

The information relating to the card holder or bearer is contained in a file 18 termed the Member file, under the main directory 15.

A System directory 16 is provided which comprises for example a file 19 relating to the card itself and other types of files 20 known per se.

According to the embodiment of the invention more particularly described here, the memory 14 comprises a directory 17 termed the "Couponing Directory" which comprises the Behavior file 21 and the Points file 22.

Embodiments of the Member file 18, the Behavior file 21 and the Points file 22 according to the invention are described below by way of example.

Member File 18
 Read code: Free
 Update code: RCode01

| Field | Format | Width |
|---|---|---|
| Card number | 999999999 | 9 |
| Type | Alpha | 2 |
| Version | 99 | 2 |
| Present applications | Y/N | 9 |
| Month/year of customization (manufacture) | yymm | 4 |
| Month/year of 1st use | yymm | 4 |
| Month/year of expiry | yymm | 4 |
| Reserved | Alpha | 46 |

Behavior File 21
 Read code: Free
 Update code: Rcode12

| Field | Format | Width |
|---|---|---|
| Merchants (up to the No. of merchants rec.): | | |
| Merchant code | 99999 | 5 |
| Business code | Alpha | 1 |
| Date of first visit | yymmdd | 6 |
| Date of last visit | yymmdd | 6 |
| Number of visits this month | 99 | 2 |
| Spend this month | 99999 | 5 |
| Number of visits this year | 999 | 3 |
| Spend this year | 999999 | 6 |
| Total number of visits | 999 | 3 |
| Total spend | 999999 | 6 |

Points File 22 (Points Counter)
 Balance read key: Free
 Debit key: RKdeb1
 Credit key: RKcred1
 PIN (for access to the debit): Rcode13

In an advantageous embodiment, provision is made for management of the security of the information in the card by encrypting the codes on the basis of the card numbers.

The application comprises for example two file access codes and two Points file access keys. The mother codes or the mother keys are incorporated into the terminal 2.

They are used to compute diversified codes and keys, which will subsequently be compared with the codes and keys built into the card. Each card comprises its own unique set of codes and keys.

This diversification is achieved through the triple DES (Data Encryption Standard) procedure, applied both to the mother codes (or the mother keys) and the card number.

The mother codes and mother keys incorporated into the terminal are for example:

| Code01 | Mother code for updating the Member file |
| Code12 | Mother code for updating the Behavior file |
| Kauth1: | Mother key for authenticating the Points file |
| Kcred1: | Mother key for crediting the Points file |

The mother codes or the mother keys are moreover and for example diversified as follows:

1. The mother codes or the mother keys (16 bytes) are split into two equal parts of 8 bytes KL (left part) and KR (right part)
2. N (the first 8 bytes of the card No.) is enciphered by KL: R1=DES(KL,N)
3. R1 on 8 bytes is deciphered by KR: R2=DES-1(KR,R1)
4. R2 on 8 bytes is enciphered by KL: R=DES(KL,R2)

R is the result on 8 bytes of the triple DES diversification of a code or a mother key and therefore represents the value built into the card.

Figure 3:
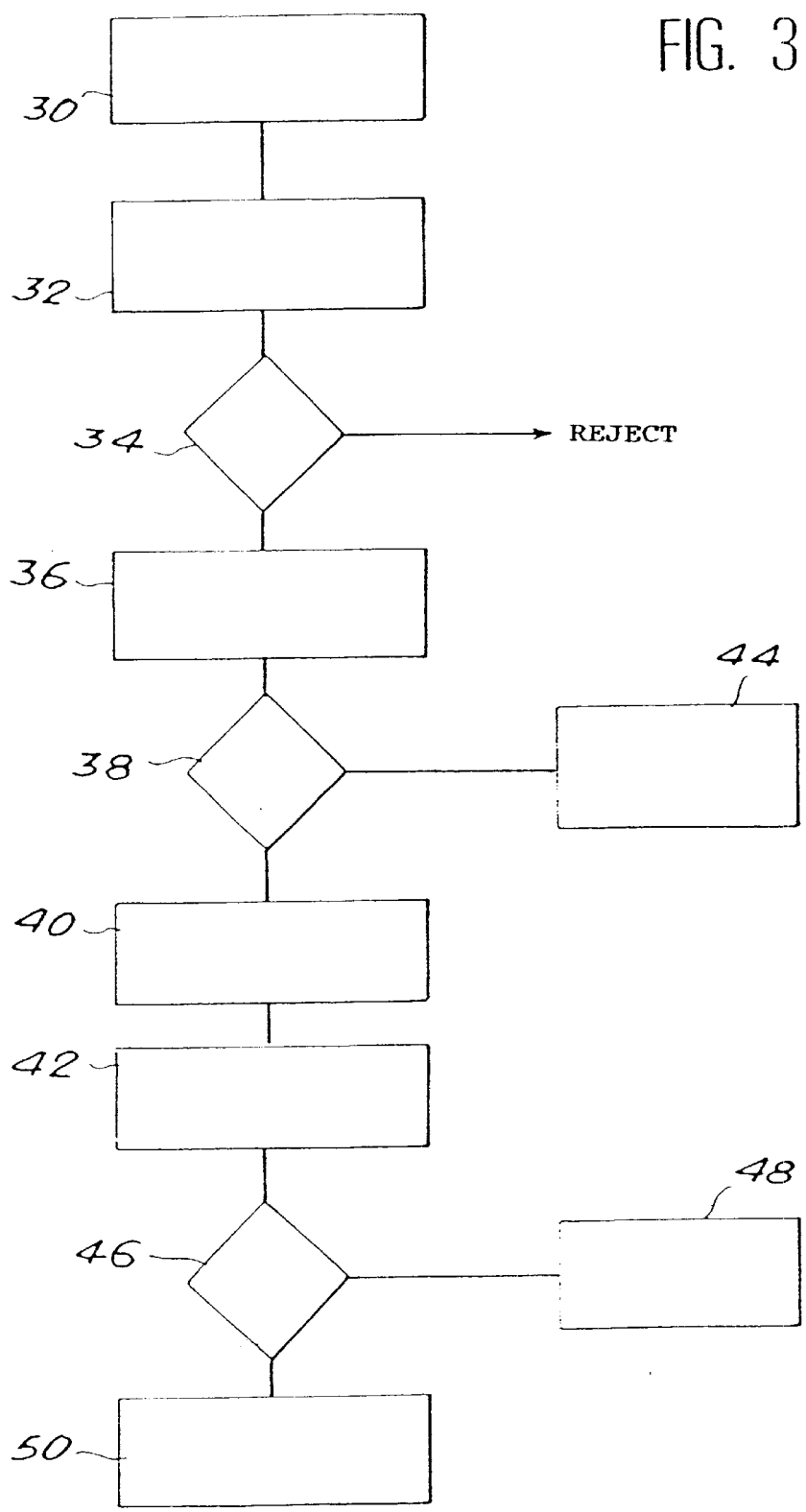
FIG. 3 is a block diagram charting the method of processing information according to the embodiment of the invention more particularly described here.

An example of the operation of the device of FIG. 1 will now be described with reference to FIG. 3.

The customer user, holder of the card, enters the card 4 into the reader 3 (step 30), and the Member, Behavior and Points files are then read (step 32).

A test step 34 on the validity of the card (date of expiry) is then performed by comparison with today's date.

Next the amount of the purchase is entered (step 36) either via the till 13 and the microcomputer 9, or via the keyboard 6.

If the total is greater than a specified value (test 38), an algorithmic processing 40 is then performed on the basis of the information contained in the Member file, the Behavior file and the Points file.

The operation leads to a step 42 of incrementing the Points file by a specified number of points based, for example, on the number of operations performed by the card holder within the month.

Otherwise (step 44), the screen 7 displays for example a "no discount" message.

A test step 46 is provided next which compares the number of points in the Points file with a specified threshold size.

If the number of points is less than this value, a message is output at 48. If it is greater, a discount coupon for a specified amount is printed (step 50).

The invention thus enables the card holder to obtain two types of benefit separately or simultaneously:

- a points credit on an electronic points counter in the chip of the card,
- a discount voucher printed at the time of the purchase, to be set against the current purchase or a later purchase.

Several examples of operation are given below.

The merchant can choose, for example, to allot 2 points to his customers on their first visit of the month, 4 points with the second visit and 6 points with the third visit each month.

Another merchant may choose to link the points credit to a transaction amount. Thus, with his first visit, the customer will receive, for example, a number of points equal to 10% of his purchase. For every subsequent visit, the points credit will be 5%.

Another merchant will choose to offer a discount voucher to be set against a purchase from him. For example, the merchant may grant a 25% discount to customers of his who come in for the first time, and 10% to the others.

The discount voucher can have a value in terms of points. In this case, the voucher is given to the customer against a points debit. For example, the merchant introduces a 25% discount voucher against an amount of 10 points—the voucher will be printed only if the card has a minimum of 10 points.

The invention also makes it possible to target specific cards. The merchant identifies beforehand the numbers of the cards in the Member file, which will receive a benefit during their later visits.

This list of cards can also be downloaded by a central system via the external link described with reference to FIG. 1.

An advantage of the invention is to be able to formulate offers on the basis of customer behavior at other merchants, each merchant belonging to a "business group", identified by a field present in the Behavior file described above.

This aspect of the invention can thus be used to identify the customers who spend little at the merchant, but a lot in a business sector close to that of the merchant. Customers thus identified can therefore be introduced to greater benefits.

Below is given an example of the parametrization of the algorithm for issuing benefits according to the invention.

Parametrization of the Algorithm

| Category | Parameter | Nature | Description |
|---|---|---|---|
| General Parameters | Minimum purchase | Amount in Centimeters | Threshold below which the operation is too small to be regarded as a visit |
| | One visit per day? | Yes | Only the first operation within one day will be regarded as a visit |
| | | No | N operations within one day = N visits |
| | Multi-visit function | Not activated | Apply the parameters of "Visit 1" for every visit. Do not update the Behavior file in the card |
| | | same Month | Distinguish between $1^{st}$, $2^{nd}$ and $3^{rd}$ visit in one month |
| | | same Year | . . . in one year |
| | | since creation of card | . . . since the creation of the card |
| | Threshold bonus | Amount | Threshold for the issuing of bonus points |
| | Points bonus | 999 | Amount of bonus points |
| Parameters Visit 1 | Points computation | Not activated | No points credit or debit at the first visit |
| | | Credit | |
| | | Debit | |
| | Points computation | Fixed | The "Points Value" field is a fixed total of points |
| | | Percentage | The "Points Value" field is a percentage of the amount of the operation |
| | Points value | 999 | Value in points (up to 999), or as a percentage (up to 99.9%) |
| | Text of coupon | Not activated | No additional message to be printed on the receipt |
| | | ASCII 2 × 20 | Print 2 rows of 20 characters, plus the info relating to the old balance, points acquired, and new balance |
| Parameters visit 2 | Points function Points computation Points value Text of coupon | cf Visit 1 | |
| Parameters visit 3 | Points function Points computation Points value Text of coupon | cf Visit 1 | |
| Parameters visits 4 and + | Points function Points computation Points value Text of coupon | cf Visit 1 | |

As is self-evident, and as results from the foregoing, the present invention is not limited to the embodiment of the invention more particularly described here. On the contrary it embraces all variants thereof and especially those in which the algorithmic processing is remotely programmable.

What is claimed is:

1. A system for dynamically storing and retrieving information in a storage medium, comprising in combination:
   an integrated circuit card having a memory structure partitioned into a first file containing information identifying the integrated circuit card, and a second file containing a plurality of data records each comprising information pertaining to prior uses of the integrated circuit card;

a card reader adapted to receive the integrated circuit card and to read and write data values to and from the memory structure of the integrated circuit card;

a processor electrically coupled to the card reader and including processor instructions for executing an algorithm that, in response to insertion of the integrated circuit card into the card reader, extracts information from one of the data records in the second file, updates the one data record in the second file based at least in part on a current date and the information extracted from the one data record in the second file, and awards a benefit to the card holder if the updated data record meets a predetermined condition; and an output device that outputs information resulting from the execution of the algorithm executed in the processor.

2. The system of claim 1, wherein the output device comprises a display terminal electrically coupled to the processor.

3. The system of claim 1, wherein:

the second file contains a plurality of data records each comprising information pertaining to prior uses of the integrated circuit card at a specific one of a plurality of different merchants, each merchant operating an independent promotional program in conjunction with the integrated circuit card, the algorithm comprises a merchant-specific algorithm that pertains to the promotional program for the specific one merchant, the algorithm awards the benefit based upon the date of a transaction in connection with which the integrated circuit card is inserted into the card reader and based upon prior purchasing behavior by the holder of the card at the specific one merchant, and the merchant-specific algorithm is independent from algorithms operated by others of the plurality of different merchants.

4. The system of claim 1, wherein:

the second file comprises a condensed summary of prior purchasing behavior by the holder of the card at a plurality of different merchants, each of which operates a different promotional program in conjunction with the integrated circuit card, the algorithm pertains and is specific to a promotional program for a specific one of the merchants with whom a transaction is being conducted, the algorithm updates the condensed summary of the prior purchasing behavior by the holder of the card at the specific one merchant, and the algorithm awards the benefit based upon the condensed summary of the prior purchasing behavior by the holder of the card at the specific one merchant.

5. The system of claim 4, wherein:

the algorithm increments an accumulation value relating to purchasing behavior by the holder of the card at one of a plurality of different merchants, and the algorithm awards the benefit based on the accumulation value.

6. A method of conducting a transaction with a cardholder using an integrated circuit card that includes a first memory area that identifies the card, and a second memory area capable of storing a plurality of records each containing data relating to the cardholder's purchasing behavior at a specific one of a plurality of different merchants, wherein each merchant operates an independent promotional program in conjunction with the integrated circuit card, the method comprising the steps of:

(1) upon insertion of the integrated circuit card into a card reader located at one of the plurality of different merchants, reading information from the first memory area and the second memory area and receiving a transaction amount corresponding to the transaction;

(2) applying a merchant-specific algorithm that pertains to the promotional program for the one merchant with whom the transaction is being conducted, wherein the merchant-specific algorithm writes to one of the records in the second memory area and generates an electronic benefit value that is dependent on the date of the transaction and on the cardholder's prior purchasing behavior at that merchant, wherein the merchant-specific algorithm is independent from algorithms operated by others of the plurality of different merchants; and (3) providing a merchant-specific benefit to the cardholder on the basis of the electronic benefit value.

7. The method of claim 6, wherein step (2) comprises the step of generating an electronic benefit value that is dependent upon a number of transactions performed by the cardholder at the one merchant within a predetermined time period.

8. A computer readable medium storing computer readable instructions that, when executed by a processor, cause a computer system to perform a method comprising:

reading first data stored upon an integrated circuit card and corresponding to a first user, said first data comprising information corresponding to said first user and information regarding dates of prior transactions between said first user and a second user;

modifying said first data when a first predefined condition based at least on said first data is met, wherein said first predefined condition comprises said first user not previously interacting with said second user during an immediately preceding predetermined amount of time; and determining whether to grant a benefit based on said modified first data meeting a second predefined condition.

9. The computer readable medium of claim 8, wherein said first user is a customer of said second user.

10. The computer readable medium of claim 8, wherein the computer performed method further comprises writing said modified first data back to a memory of said integrated circuit card.

11. The computer readable medium of claim 8, wherein said predetermined amount of time comprises at least one of a current year, a current month, a current day, and a time since creation of the integrated circuit card.

12. The computer readable medium of claim 8, wherein said computer readable instructions further perform the step of receiving second data from an input device corresponding to the second user, and wherein said first predefined condition is based at least on said second data.

13. The computer readable medium of claim 12, wherein said second data comprises an amount of a transaction between said first user and said second user, and wherein said first predefined condition is based on said transaction amount.

14. The computer readable medium of claim 12, wherein said input device comprises a data processing device.

15. The computer readable medium of claim 14, wherein said data processing device comprises a till.

16. The computer readable medium of claim 14, wherein said data processing device comprises a microcomputer.

17. The computer readable medium of claim 8, wherein said second user comprises a merchant.

18. The computer readable medium of claim 8, wherein said first data is encrypted.

19. A computer readable medium storing computer readable instructions that, when executed by a processor, cause a computer system to perform a method of granting a customer a benefit, said method comprising:

upon insertion of a customer-held integrated circuit card into a card reader located at one of a plurality of different merchants, each merchant operating an independent promotional program in conjunction with the integrated circuit card, reading from the integrated circuit card data relating to said customer and prior transactions between said customer and the one merchant, said data comprising a benefit determination value;

applying a merchant-specific algorithm that pertains to the promotional program for the one merchant, wherein the merchant-specific algorithm generates an electronic benefit value if the customer has not visited the one merchant during an immediately preceding predetermined amount of time, and wherein the merchant-specific algorithm is independent from algorithms operated by others of the plurality of different merchants; and providing a merchant-specific benefit to the cardholder on the basis of the electronic benefit value.

20. An integrated circuit card corresponding to a customer, comprising:

a first set of information corresponding to said customer;

a second set of information corresponding to merchants with whom said customer transacts, wherein said second set of information comprises a first value corresponding to a number of merchants that said integrated circuit card can record, and a second value corresponding to a number of merchants that said integrated circuit card has recorded; and a third set of information corresponding to transactions between said customer and said merchants.

21. The integrated circuit card of claim 20, wherein said first set of information comprises:

a type of said card;

a version of said card;

an indicator corresponding to the presence of applications; and a date of first use.

22. The integrated circuit card of claim 20, wherein said third set of information comprises a record for each of said merchants, each record comprising a merchant code identifying the each of said merchants to which the record corresponds, and cumulative numeric information corresponding to said transactions between said customer and said each of said merchants to which the record corresponds.

23. The integrated circuit card of claim 22, wherein said cumulative numeric information comprises a total amount of money spent by said customer at said each of said merchants to which the record corresponds.

24. The integrated circuit card of claim 22, wherein said field for cumulative numeric information comprises a total number of visits by said customer to said each of said merchants to which the record corresponds.

25. The integrated circuit card of claim 22, wherein each record further comprises:

a business code identifying a type of business of the each of said merchants to which the record corresponds, a date of first visit to the each of said merchants to which the record corresponds, a date of last visit to the each of said merchants to which the record corresponds;

a number of visits during a current month by said customer to the each of said merchants to which the record corresponds;

an amount of money spent by said customer during a current month at the each of said merchants to which the record corresponds;

a number of visits by said customer during a current year to the each of said merchants to which the record corresponds; and an amount of money spent by said customer during a current year at the each of said merchants to which the record corresponds.

26. The integrated circuit card of claim 20, wherein each set of information is encrypted.

27. A system for allowing a merchant to grant a benefit to a customer at the time of a transaction, said system comprising:

a card reader that allows an integrated circuit card to be inserted and read for data stored thereon;

an input device for inputting an amount of said transaction;

a data processing device that determines whether said benefit will be granted to said customer by executing an algorithmic process based on data read from the card and on one or more predefined conditions, wherein said merchant can modify said predefined conditions in order to customize the system of granting benefits and wherein said predefined conditions may further be modified based on transactions between customers and other merchants of a similar business type; and an output device for outputting a result of said determination.

28. A system for dynamically storing and retrieving information in a storage medium, comprising in combination:

an integrated circuit card having a memory structure including a first data set containing information identifying the integrated circuit card and a second data set containing a plurality of data records each comprising information pertaining to prior uses of the integrated circuit card;

a card reader adapted to receive the integrated circuit card and to read and write data values to and from the memory structure of the integrated circuit card;

a processor electrically coupled to the card reader and including processor instructions for executing an algorithm that, in response to insertion of the integrated circuit card into the card reader, extracts information from one of the data records in the second data set and writes to the one data record in the second data set based on a current date and the information extracted from the one data record in the second data set; and an output device that outputs information resulting from the execution of the algorithm executed in the processor, wherein the algorithm generates a first electronic benefit value if insertion of the integrated circuit card into the card reader corresponds to a first visit by the cardholder to a merchant during a predetermined time period, and generates a second electronic benefit value different from the first electronic benefit value if insertion of the integrated circuit card into the card reader corresponds to a subsequent visit by the cardholder to the merchant during the predetermined time period, wherein the number of visits during the predetermined time period is stored in the second data set.

29. A system for dynamically storing and retrieving information in a storage medium, comprising in combination:
   an integrated circuit card having a memory structure including a first data set containing information identifying the integrated circuit card and a second data set containing a plurality of data records each comprising information pertaining to prior uses of the integrated circuit card;
   a card reader adapted to receive the integrated circuit card and to read and write data values to and from the memory structure of the integrated circuit card;
   a processor electrically coupled to the card reader and including processor instructions for executing an algorithm that, in response to insertion of the integrated circuit card into the card reader, extracts information from one of the data records in the second data set and writes to the one data record in the second data set based on a current date and the information extracted from the one data record in the second data set; and
   an output device that outputs information resulting from the execution of the algorithm executed in the processor, wherein
      the algorithm generates an electronic benefit value that is dependent on a total amount of cumulative spending at a merchant during a predetermined time period.

30. A system for dynamically storing and retrieving information in a storage medium, comprising in combination:
   an integrated circuit card having a memory structure partitioned into a first data set containing information identifying the integrated circuit card and a second data set containing a plurality of data records each comprising information pertaining to prior uses of the integrated circuit card;
   a card reader adapted to receive the integrated circuit card and to read and write data values to and from the memory structure of the integrated circuit card;
   a processor electrically coupled to the card reader and including processor instructions for executing an algorithm that, in response to insertion of the integrated circuit card into the card reader, extracts information from one of the data records in the second data set and writes to the one data record in the second data set based on a current date and the information extracted from the one data record in the second data set; and
   an output device that outputs information resulting from the execution of the algorithm executed in the processor, wherein:
      the plurality of data records in the second data set comprise data relating to purchasing behavior by a holder of the card at a specific one of a plurality of different merchants with each merchant operating an independent promotional program in conjunction with the integrated circuit card,
      the algorithm comprises a merchant-specific algorithm that pertains to the promotional program for the specific one merchant,
      the algorithm generates a first electronic benefit value if insertion of the integrated circuit card into the card reader corresponds to a first visit by the cardholder to a merchant during a predetermined time period, and generates a second electronic benefit value different from the first electronic benefit value if insertion of the integrated circuit card into the card reader corresponds to a subsequent visit by the cardholder to the merchant during the predetermined time period, wherein the number of visits during the predetermined time period is stored in the second data set,
      the algorithm generates an electronic benefit value that is dependent on a total amount of cumulative spending at a merchant during a predetermined time period,
      the algorithm does not award a benefit if the cardholder has previously visited a merchant on the same day, and
      the processor is coupled to a till.

31. A system for dynamically storing and retrieving information in a storage medium, comprising in combination:
   an integrated circuit (IC) card having a memory, the IC card memory including a plurality of data sets, each set of data including information pertaining to prior uses of the IC card;
   a first card reader located at a first merchant and adapted to receive the IC card and to read and write data to and from the IC card memory;
   a first processor electrically coupled to the first card reader and including processor instructions for executing a first algorithm in response to insertion of the IC card into the first card reader, the first algorithm extracting information from one of the plurality of data sets in the IC card memory and writing to the one set of data based on a current date and on the information extracted by the first algorithm, wherein the one set of data contains information representing a number of visits to the first merchant by a holder of the IC card;
   a first output device electrically coupled to the first processor so as to output information resulting from execution of the first algorithm, the first algorithm further generating a first electronic benefit value dependent on the number of visits to the first merchant by the IC card holder;
   a second card reader located at a second merchant and adapted to receive the IC card and to read and write data to and from the IC card memory;
   a second processor electrically coupled to the second card reader and including processor instructions for executing a second algorithm in response to insertion of the IC card into the second card reader, the second algorithm extracting information from a second one of the plurality of data sets in the IC card memory and writing to the second set of data based on a current date and the information extracted by the second algorithm, wherein the second set of data contains information representing a cumulative amount spent at the second merchant by the IC card holder; and
   a second output device electrically coupled to the second processor so as to output information resulting from execution of the second algorithm, the second algorithm further generating a second electronic benefit value dependent on the cumulative amount spent at the second merchant by the IC card holder.

32. An integrated circuit (IC) card corresponding to a customer, comprising:
a first set of data containing information representing a number of visits to a first merchant by the customer, the card configured such that when the card is inserted into a first card reader located at the first merchant, a first processor electrically coupled to the first card reader executes a first algorithm in which:
information is extracted from the first set of data,
information is written to the first set of data based on a current date and on the information extracted from the first set of data,
the number of visits to the first merchant by the customer permits generation of a first electronic benefit value, and
information resulting from execution of the first algorithm is output by a first output device electrically coupled to the first processor; and
a second set of data containing information representing a cumulative amount spent at a second merchant by the customer, the card configured such that when the card is inserted into a second card reader located at the second merchant, a second processor electrically coupled to the second card reader executes a second algorithm in which:
information is extracted from the second set of data,
information is written to the second set of data based on a current date and on the information extracted from the second set of data,
the cumulative amount spent at the second merchant by the customer permits generation of a second electronic benefit value, and
information resulting from execution of the second algorithm is output by a second output device electrically coupled to the second processor.

* * * * *